United States Patent [19]

Cole et al.

[11] 4,406,359

[45] Sep. 27, 1983

[54] METHOD AND APPARATUS FOR MASS TRANSIT OF CYLINDRICAL ARTICLES BETWEEN DIFFERING ELEVATIONS

[75] Inventors: Rodger E. Cole, Golden; Richard H. Vander Meer, Arvada, both of Colo.

[73] Assignee: Goldco Engineering, Inc., Golden, Colo.

[21] Appl. No.: 227,300

[22] Filed: Jan. 22, 1981

[51] Int. Cl.³ .................... B65G 15/14; B65G 17/46
[52] U.S. Cl. .................................. 198/626; 198/689; 198/811
[58] Field of Search ........ 198/689, 604, 605, 626–628, 198/811

[56] References Cited

U.S. PATENT DOCUMENTS 3,603,448  7/1971  Okano ......................... 198/689 X
3,741,366  6/1973  Van Melle et al. ........... 198/689 X

*Primary Examiner*—James G. Smith
*Assistant Examiner*—Douglas D. Watts
*Attorney, Agent, or Firm*—O'Rourke & Harris

[57] ABSTRACT

Apparatus and method for transporting articles, such as cylindrical containers, between differing elevations by initially conveying articles onto a foraminous belt, conducting the belt over a first plenum having a curved supporting surface to secure the articles to the belt and the belt to the surface by means of vacuum while transitioning the articles and belt from a level to an inclined orientation, conveying the articles to a differing elevation while inclined by securing the articles between parallel, spaced belts, and again transitioning from an inclined orientation to a level orientation by passing the foraminous belt over a second plenum having a curved supporting surface and securing the articles to the belt and the belt to the surface by means of vacuum during transition from the inclined orientation to the horizontal orientation.

7 Claims, 3 Drawing Figures

METHOD AND APPARATUS FOR MASS TRANSIT OF CYLINDRICAL ARTICLES BETWEEN DIFFERING ELEVATIONS

BACKGROUND OF THE INVENTION

1. Field of the Invention

The present invention relates generally to the mass transport of articles, such as cylindrical containers, from a first elevation to a second elevation, and, particularly, to a method and apparatus for transporting articles from a level orientation on a first elevation to a level orientation on a second elevation by initially conveying the articles onto a foraminous belt, moving the belt over a low pressure containing plenum having a curved supporting surface to secure the articles to the belt and the belt to the surface by means of vacuum, moving the belt and secured articles over the curved surface to an inclined orientation, securing the articles to the inclined belt by means of a second parallel inclined belt to thus contain the articles between the spaced moving belts while being conveyed in an inclined orientation, and again moving the foraminous belt from an inclined to a level orientation while passing over a second low pressure plenum having a curved supporting surface to again secure the articles to the foraminous belt and the belt to the surface while undergoing the transition from the inclined orientation to the level orientation.

2. Description of the Prior Art

In many manufacturing operations, and particularly in the manufacture of cylindrical containers such as two piece ferrous or aluminum cans, it is necessary to mass transport great numbers of articles. While some conveying systems provide for single line, i.e., single file, transport of the articles, the great number of cans or other articles being transported requires extremely high linear speeds to maintain line speeds up to 2000 articles a minute. Thus, in many instances, the articles are mass conveyed across fairly broad conveyer systems rather than in a single file arrangement. When empty, articles such as cans tend to be marginally unstable and may be toppled over if not handled with care.

Conventionally, articles such as those of concern are mass conveyed between different elevations by means of a belt conveyer inclined with a very small slope. Accordingly, in order to gain any substantial difference in elevation, the conveyer must extend for great distances. If additional slope is provided, the cans tend to slide on the belt, fall over, or jam at the discontinuity between the level and sloped portions. Since belts tend to assume a catenary curve between supports, and to approach a straight line between rollers with appropriate tension, the transition from one belt to another belt under tension tends to be in the form of discontinuity rather than a gradual curve.

It is also known to secure articles such as those with which the instant invention is concerned to a perforated rotating drum by means of a vacuum in the drum. Such drums are usually utilized to engage an article, carry the article around the drum for 180°, and then deposit the article on another conveyor system, thereby inverting the article. Particularly for processes such as washing, rinsing, coating etc. such inversion is desirable.

Still another verticle transport method usually utilized with single line transport is spaced, parallel belts moving at the same linear velocity. These belts sandwich the articles therebetween, and transport the articles to another level. However, such transport systems using parallel belts are subject to the above discussed directional discontinuties between a level and substantially inclined path. By utilizing the spaced belts on a single line section, individual cans may be transported from the level to the vertical or inclined belts. Mass transport as opposed to single line transport, between spaced belts is clearly a much more difficult problem.

SUMMARY OF THE INVENTION

The present invention, which affords a heretofore unavailable apparatus and method for mass transport of articles, such as cylindrical containers, comprises a pair of parallel, spaced belts moving at the same velocity in an inclined manner. The spaced belts are adapted to secure articles therebetween for transport between differing elevations. At the approach and exit from the inclined, parallel belts, the difficult transition is accomplished from level to the desired incline by passing a foraminous belt over the perforated curved surface of a plenum with a vacuum provided therein. The vacuum communicates with the underside of the belt at the curved surface thereby conforming the belt in a smooth, curvilinear fashion from the level to inclined orientation, and at the same time communicates through the perforations in the belt to secure the articles to the belt while transitioning from differing directions of travel, i.e., from level to inclined orientations or vice versa. The curved surfaces of the plenum communicating with the belt are concave at one end of the transport apparatus, and convex at the other end. Also, while it is preferred that a single belt be employed to convey the articles from the level or approach orientation, to the first transition, between the spaced parallel belts, and then through the second transition to the ultimate level orientation, it is of course operable to utilize segmented individual belts for the differing zones of operation.

Accordingly, it is an object of the present invention to provide a new method and apparatus for mass conveying articles between differing elevations.

Another object of the present invention is to provide a new and improved method and apparatus for securing and stabilizing cylindrical articles during transition from a level orientation to an inclined orientation through a curvilinear path of travel, and from the inclined orientation back to the level orientation.

Yet another object of the present invention is to provide a new and improved method and apparatus for configuring a transport belt to convey articles along a curved path of travel.

These and other objects of the present invention will become apparent from the following drawings and description.

DETAILED DESCRIPTION OF THE INVENTION

Figure 1:
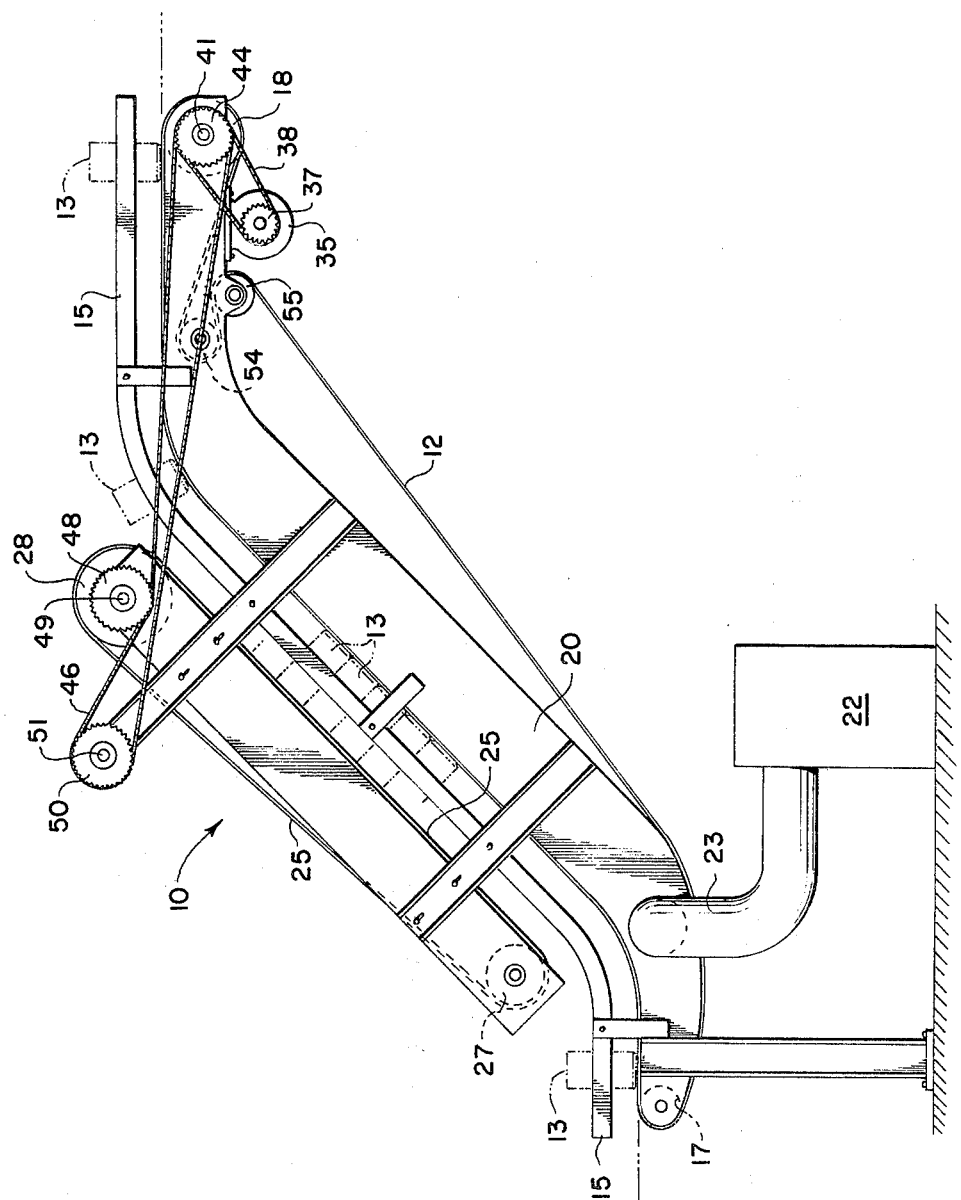
FIG. 1 is a side view of a apparatus for mass transport of articles between differing levels in accord with the instant invention.
Figure 2:
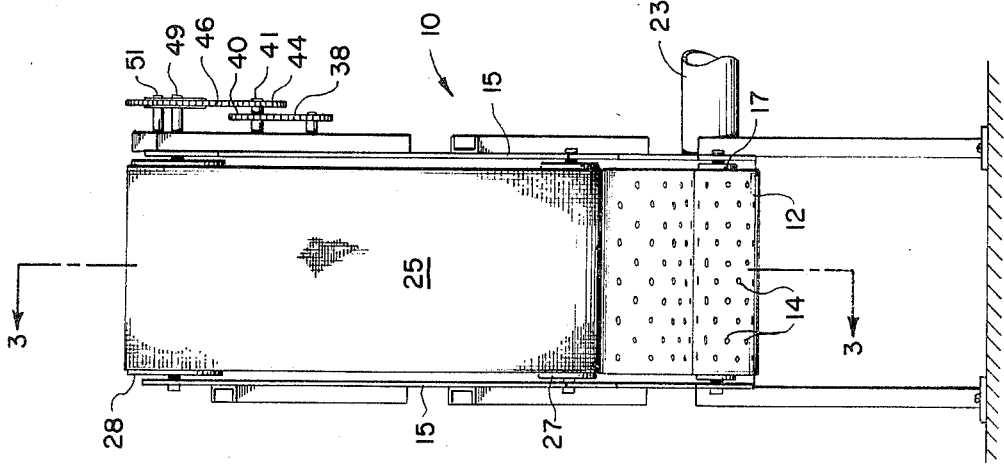
FIG. 2 is an end view of the apparatus illustrated in FIG. 1 illustrating the approach portion of the conveying belt.

Turning now to the drawings, wherein like components are designated by like reference numerals throughout the various figures, a mass transport elevator for articles is illustrated in FIG. 1 and generally designated by reference numeral 10. With particular attention to FIG. 1, it will be seen that elevator 10 includes an elongated foraminous belt 12 supporting articles 13. With reference to FIG. 2, perforations 14 in foraminous belt 12 are provided and spaced such that at least one perforation 14 will be adjacent the under surface of each article 13. Side rails 15 are provided adjacent belt 12 to contain articles 13 therebetween. The transport portion of belt 12 extends in a nonlinear manner between rollers 17 and 18, and over lower plenum 20 as will be described in more detail below. Plenum 20 is connected to vacuum source 22 by duct 23. Spaced from but at least partially over plenum 20 is parallel belt 25, carried on rollers 27 and 28. As shown in FIG. 1, belt 12 cooperates over a portion thereof with belt 25 to secure articles 13 therebetween. Upper plenum 30 is provided adjacent the upper end of parallel belt 25, and at least partially thereunder.

Motor 35, carrying sprocket 37, drives chain 38 to in turn rotate sprocket 40 attached to journaled shaft 41 carrying roller 18. Sprocket 44 is also carried on shaft 41 axially outboard of sprocket 40 and drives chain 46, which in turn engages sprocket 48 to rotate shaft 49 upon which roller 28 is carried. Idler sprocket 50 carried on shaft 51 supports chain 46. It will be appreciated, as a result of the size of sprockets 37, 40, 44 and 48, and rollers 18 and 28, belt 25 will be driven by motor 35 at a linear velocity identical to that of belt 12. Accordingly, articles 13 contained between belts 12 and 25 will not only be supported, but also will be carried by belts 12 and 25 in a stable manner. Tensioning rollers 55 and 56 are provided to accommodate stretch and provide appropriate tension for belt 12. It is to be understood of course that the drive arrangement illustrated in somewhat simplified, and in an ideal situation motor 35 would be more centrally located with shorter runs of chains between the differing portions of elevator 10. Such drives systems, which may include shaft and gear drives etc., are well within the skill of the art.

Figure 3:
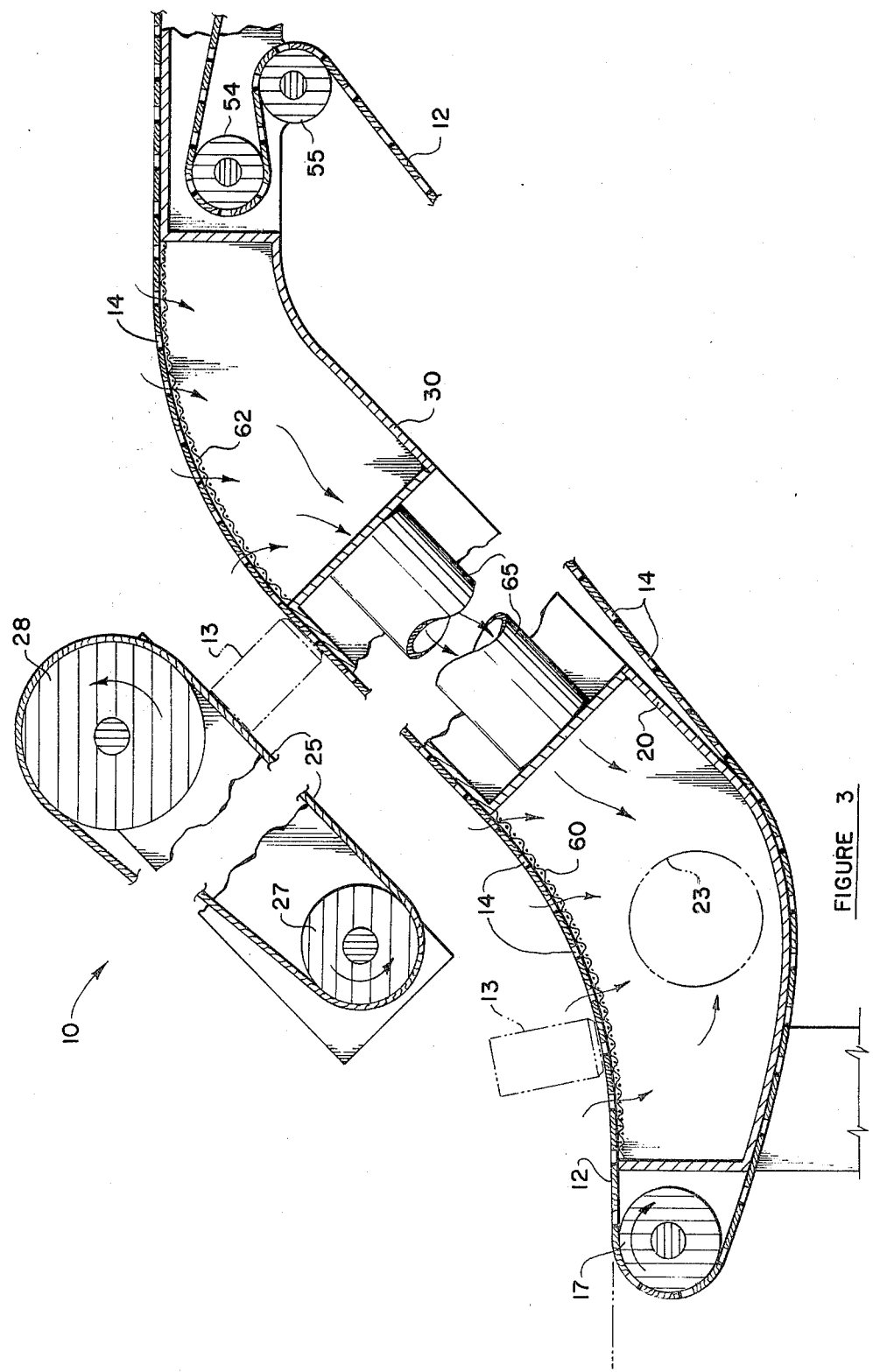
FIG. 3 is a section view along section line 3—3 of FIG. 2.

Operation of elevator 10 will be more readily understood with reference to FIG. 3, wherein the particularly significant features are illustrated in section, and in simplified form. As shown, lower plenum 20 includes as the upper surface thereof in contact with belt 12 a perforated curved surface 60, preferrably of expanded metal. As a result of the vacuum developed in plenum 20, belt 12 is maintained in contact with curved surface 60 in a smooth fashion, while article 13 is, as a result of the same vacuum, secured to belt 12 as a result of the vacuum communicating with the lower surface of article 13 through perforations 14 in belt 12. As will be apparent, article 13, while moved along belt 12 over the upper surface 60 of plenum 20, travels in a stable manner along a smooth curve. This is in contrast to the normal tendency of belt 12 to assume a straight line under tension.

At such time as the upper portion of article 13 comes into contact with belt 25, which is moving at a linear speed the same as that of belt 12, article 13 is secured between belts 12 and 25 in a stable manner, and may be moved along a substantial incline. As is evident from FIG. 3, belts 12 and 25 are parallel for a substantial distance and capable of conveying articles 13 at steep inclines. It is anticipated that the linear speed of belts 12 and 25 may be conveniently—though somewhat arbitrarily—about 50 feet per minute, though speeds of 70 feet per minute and greater are contemplated. Total capacity of elevator 10 would of course be a function of the width and speed of belt 12.

At such time as article 13 reaches the portion of belt 25 adjacent roller 28, the lower portion thereof will be in communication with upper plenum 30, again having a curved, perforated upper surface 62 of, preferably, open metal mesh, whereupon the vacuum communicating with the lower portion of article 13 through perforation 14 will stabilize article 13 when released from belt 25. Again, belt 12 traveling over curved surface 62 will transition article 13 from an inclined orientation to a level orientation, whereupon conventional conveying and transport of article 13 is again feasible. Duct 65, as illustrated, communicates between plenums 20 and 30, though of course plenums 20 and 30 may be interconnected in other fashions, or may each have an independent vacuum source communicating therewith.

From the above description, it will be evident to those skilled in the art, that belts 12 and 25 may be of substantial width and thus may serve to transport transverse rows of articles 13 of any practical width.

In summary, the use of a perforated upper surface defining plenums connected with a vacuum source provides both stabilization of a foraminous belt and, in the case of a concave upper surface, prevents the belt from separating from the surface. Also as a result of the vacuum operating through perforations in the foraminous belt, articles carried on the belt are stabilized. This, in turn, permits articles to be transported at relatively high speeds through a transition zone from level to a substantial inclination around a relatively small diameter curved surface, the diameter being substantially less than that at which a normal belt may be inclined for given articles. At such time as the article is transitioned from level to the desired inclination, it is captured between spaced, parallel belts moving at the same speed. While secured between the belts, the articles may be transported substantial vertical distances. When released from the parallel belts, another plenum is provided to again provide for stabilization of the articles while moving through a transition from inclined to level orientations. If elevation from a lower to greater heighth is desired, the entrance plenum will have a concave surface and the exit plenum will have a corresponding convex surface. If this relationship is reversed, the apparatus serves to transport articles from a greater elevation to a lower elevation.

While only one particular useful and detailed embodiment of the invention has been described and illustrated, it is expected that those skilled in the art will recognize numerous changes and modifications to the described and illustrated embodiment, and that such changes and modifications may be utilized within the scope of the invention as defined by the following claims.

We claim:

1. Apparatus for transporting a plurality of similarly oriented substantially identical articles closed at at least one end between differing levels, the apparatus comprising:
   a first plenum having a perforated, curved upper surface;

a second plenum vertically spaced from the first plenum and having a perforated, curved upper surface;

means for providing a low pressure volume, the low pressure means communicating with the interiors of the first and second plenums by means of a direct communication between one of the plenums and the low pressure means and a duct connecting the plenum communicating with the low pressure means to the other plenum;

at least one movable foraminous belt adapted to be supported by and moved over the upper surfaces of the first and second plenums and extending substantially linearly between the upper surfaces of the first and second plenums in an inclined configuration, the belt section adapted to be supported by and move over the upper surface of the first and second plenums; and spaced belt means positioned parallel to and adjacent to only the linear inclined section of the foraminous belt extending between but spaced from the upper surfaces of the first and second plenums, the spaced belt means being adapted to move at a linear velocity substantially identical to the coresponding, parallel inclined section of the movable belt;

whereby the foraminous movable belt will be held in contact with the perforated curved surfaces of the first and second plenums, and articles carried on such belt will be secured to the belt by means of the low pressure contained in the plenums thereby permitting transition of articles from a level attitude to an inclined attitude for transport between the spaced, parallel belt sections.

2. Apparatus for transporting a plurality of articles as set forth in claim 1 in which the movable belt is comprised of a single continuous foraminous belt carried on journaled rollers.

3. Apparatus for transporting a plurality of articles as set forth in claim 1 in which one of the curved upper surfaces of the plenums is concave and the other of the curved upper surfaces of the plenums is convex.

4. Apparatus for transporting a plurality of articles as set forth in claim 3 in which the concave and convex curved surfaces are of substantially equal radius and extend through a substantially equal arc.

5. Apparatus for transporting a plurality of articles as set forth in claim 1 in which the curved upper surfaces of the plenum are of open metal mesh.

6. Apparatus for transporting a plurality of articles as set forth in claim 1 in which both the movable belt and spaced belt means are driven through mechanical drive means by a single motor to thereby synchronize the linear speeds of the parallel sections of the movable belt and spaced belt means.

7. A method for transporting a plurality of similarly oriented, substantially identical articles, having at least one closed end between differing levels, the method comprising:

supporting a plurality of articles upon a substantially horizontal section of a foraminous belt;

transporting the articles on the foraminous belt over a plenum having a perforated, curved upper surface supporting the foraminous belt;

maintaining a vacuum in the first plenum to communicate with and to urge the foraminous belt and articles onto the upper surface of the plenum, and the articles onto the foraminous belt;

conveying the articles from the horizontal supporting attitude on the foraminous belt along the curved section defined by the upper curved section of the first plenum to an inclined supporting attitude with the vacuum operating directly upon the articles to secure the articles to the foraminous belt as such belt moves;

securing the articles between the foraminous belt and a second, parallel belt above the foraminous belt and moving at the same linear speed as the foraminous belt as the articles are moved past the end of the first plenum and are released from the vacuum;

transporting the articles along an inclined linear section of the foraminous belt while secured between the spaced, parallel belts;

transitioning the articles from the inclined attitude at the terminus of the second belt at a second plenum having a perforated, curved upper surface and also in communication with a vacuum as the articles move from the upper, spaced parallel belts; and moving the articles to a horizontal supporting attitude on the foraminous belt as the articles move over the curved, perforated upper surface of the second plenum while the belt is held in contact with the upper surface of the plenum and the articles are secured to the belt through the perforations therein solely as a result of the vacuum in the plenum acting directly upon the articles.

* * * * *